United States Patent
Chen

Patent Number: 5,682,192
Date of Patent: Oct. 28, 1997

[54] APPARATUS AND METHOD FOR DIGITAL HYBRID-TONE GRAY SCALE REPRODUCTION

[75] Inventor: Inan Chen, Webster, N.Y.

[73] Assignee: Xerox Corporation, Stamford, Conn.

[21] Appl. No.: 163,783

[22] Filed: Dec. 9, 1993

[51] Int. Cl.⁶ .............................. B41J 2/385; B41J 2/41; G03G 13/04
[52] U.S. Cl. .................... 347/131; 347/112; 347/132
[58] Field of Search ................... 358/208, 272, 358/256, 455, 456, 457, 458, 459, 447, 448, 465, 466, 298; 347/131, 130, 132, 135, 195, 12, 40, 237

[56] References Cited

U.S. PATENT DOCUMENTS

| | | | |
|---|---|---|---|
| 4,596,995 | 6/1986 | Yamakawa et al. | 347/237 |
| 4,663,734 | 5/1987 | Berry | 347/195 |
| 4,675,692 | 6/1987 | Goshima et al. | 347/12 |
| 4,916,470 | 4/1990 | Kovacs et al. | 346/160 |
| 4,955,736 | 9/1990 | Iwata et al. | 347/195 |

OTHER PUBLICATIONS

Japanese Patent; N. Kawamura, N. Kitajima, H. Kadowaki; Halftone Reproduction on Digital Color Printer Based on Electrophotography (II); p. 1.

R. Loce and W. Lama; Halftone Banding Due to Vibrations in a Xerographic Image Bar Printer; 1990; pp. 6–10.

Kunio Yamada and Yoshitsugu Hirose; Improvement of Halftone Dot Reproductivity in Laser–Xerography; pp. 173–177.

Inan Chen; Nature of Halftone Gray Scale Images in Digital Eletrography; 1990; pp. 376–387.

Inan Chen; Stochastic Model of Halftone Images in Digital Electrography; Jan./Feb. 1991; pp. 44–48.

W. Lama, S. Feth, and R. Loce; Hybrid (Gray Pixel) Halftone Printing; 1989;, pp. 130–135.

Inan Chen; Optimization of Photoreceptors for Digital Electrophotography; 1990; pp. 15–20.

*Primary Examiner*—Benjamin R. Fuller
*Assistant Examiner*—Raquel Yvette Gordon
*Attorney, Agent, or Firm*—Michael J. Nickerson

[57] ABSTRACT

To create a latent electrostatic gray scale image on a charge receptor, a gray scale generator determines a charge distribution for a unit cell having at least two pixels. A charge manager then determines the amount of charge to be placed in each pixel. More specifically, the charge amount for a first ON pixel in the unit cell is assigned a relative full charge amount. The charge amount in each succeeding ON pixel is determined such as to ensure faithful reproduction of gray scale for any given ratio of pixel size to charge receptor thickness. To increase the developability in proportion to the gray scale, the charge manager manages the charge amount of succeeding ON pixels to be a smaller amount than the first ON pixel.

36 Claims, 12 Drawing Sheets

APPARATUS AND METHOD FOR DIGITAL HYBRID-TONE GRAY SCALE REPRODUCTION

The present invention is related generally to an apparatus for producing hybrid-tone images in a digital electrostatographic copier or digital electrostatographic printer. More specifically, the present invention is directed to a method and apparatus for marking gray pixels that have continuous values from white to black (0 to 1) while maintaining high quality gray scale reproduction for any ratio of unit cell size to the thickness of charge receptor. The charge receptor includes photoreceptors for electrophotography and electroreceptors for ionography.

BACKGROUND OF THE PRESENT INVENTION

Conventionally, digital marking or printing using a gray scale reproduction is achieved by a half tone method in which one pixel within an array of mxn pixels of a unit cell is assigned either a 1 or 0 (ON or OFF). In this gray scale reproduction, a digital marking engine marks 1 pixel such that the intended gray level is 1/mxn. On the other hand, a hybrid-tone method can be used in a digital marking engine. More specifically, in the hybrid-tone method, the marking of each pixel has fractional values such as ½, ¼, etc. in addition to 0 (white) and 1 (black).

The hybrid-tone method improves the gray scale reproduction by being able to increase the number of gray steps without reducing resolution frequency. A more detailed explanation of this process is set forth in an article entitled, "*Hybrid (Gray Pixel) Half Tone Printing*" by W. Landa et al., published in the Journal of Imaging Technology, Vol. 15, No. 3, June 1989.

Although the conventional method described in the Article, noted above, produces a good quality image, the image begins to deteriorate using this method as the resolution increases. More specifically, this method fails to consider the relationship between the size of the pixel and the thickness of the charge receptor (photoreceptor or electroreceptor). In other words, the image development process for a digital electrostatographic engine is electrostatic in nature.

By only concentrating on the number of gray steps needed to produce a high quality image, conventional methods or aparatii have failed to consider the importance of the electrostatic force due to the surface charges in the image developing process. The electrostatic force is a dominant force which can adversely affect image quality.

The present invention, on the other hand, controls or manages the electrostatic forces present in the image development process to improve image quality. Furthermore, by emphasizing the electrostatic nature of the image developing process and analyzing the differences among various conditions, the applicability of the results can be generalized for all image development devices and not limited to any specific development method or device.

OBJECTS AND SUMMARY OF THE PRESENT INVENTION

Therefore, one object of the present invention is to provide an apparatus and method which improves upon image quality of a digitally produced image by controlling or managing the electrostatic forces present in the gray scale image development process.

One aspect of the present invention is a method for managing charge distribution during the forming of a latent image on a charge receptor in accordance with a generated gray scale value for a unit cell. The present invention, according to this aspect, establishes a reference amount of charge to be located in an individual ON pixel area of the unit cell on the charge receptor and compensates for the charge present in a preceding ON pixel area in a succeeding ON pixel area.

Another aspect of the present invention is a system for managing charge distribution during the forming of a latent image on a charge receptor in accordance with a generated gray scale value for a unit cell. The present invention, according to this aspect, includes a charge formation device for establishing a reference amount of charge to be located in an individual ON pixel area of the unit cell on the charge receptor and a compensation device for compensating for the charge present in a preceding ON pixel area in a succeeding ON pixel area.

A third aspect of the present invention is a method for managing charge distribution of a latent gray scale image on a charge receptor. This aspect generates a gray scale value for a unit cell having at least two pixels and establishes a charge value for each individual pixel of the unit cell corresponding to the generated gray scale value. The charge value for a first ON pixel in the unit cell is assigned a unit charge value. Each charge value corresponding to succeeding ON pixels has a value which is less than the unit charge value assigned to the first ON pixel.

A fourth aspect of the present invention is a system for managing charge distribution of a latent gray scale image on a charge receptor. The present invention, according to this aspect, includes a gray scale generator for generating a gray scale value for a unit cell having at least two pixels and a charge management circuit for establishing a charge value for each individual pixel of the unit cell corresponding to the generated gray scale value. The charge value for a first ON pixel in the unit cell is assigned a unit charge value, and each charge value corresponding to succeeding ON pixels has a value which is less than the unit charge value assigned to the first ON pixel.

Further objects and advantages of the present invention will become apparent from the following description and the various features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein.

DETAILED DESCRIPTION OF THE PRESENT INVENTION

Figure 1:
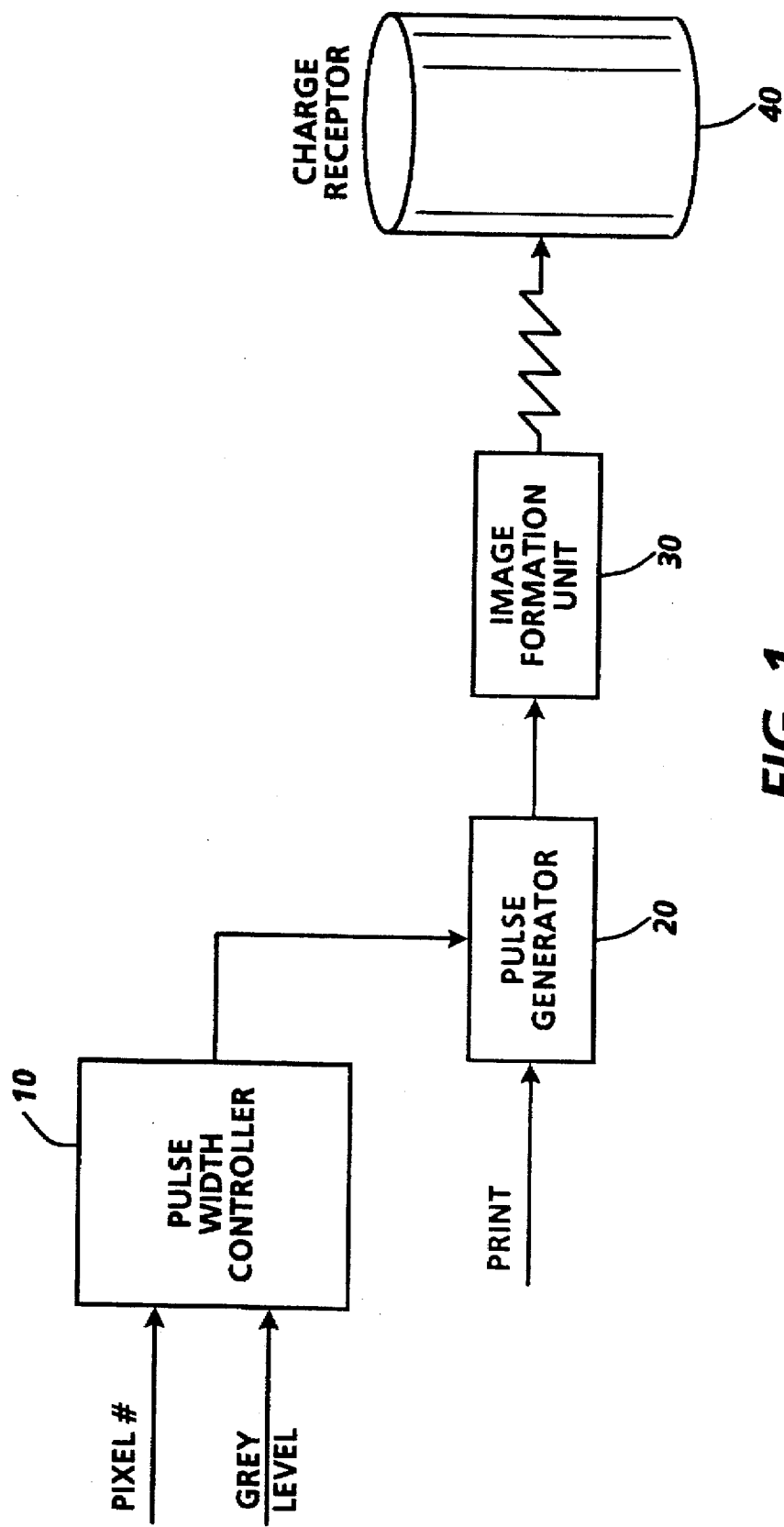
FIG. 1 illustrates a block diagram of one embodiment of the present invention.

For a general understanding of the features of the present invention, reference is made to the drawings. In the drawings, like reference numerals have been used throughout to designate identical elements.

The following description also includes references to charge receptor. Charge receptor refers to the device or material on which the latent image is formed. For purposes of clarification, the charge receptor is intended to refer to either a photoreceptor in an electrophotographic system or an electroreceptor in an ionographic system, operated in either write-white or write-black modes. The present invention is applicable to both types of systems/modes since both systems/modes rely upon the presence of an amount of charge on the charge receptor to form or define the latent image.

Moreover, the following description also includes references to unit cell and pixel. Unit cell refers to the total area on the charge receptor that will be processed to generate a single gray scale image data. On the other hand, a pixel is component of the unit cell wherein the pixel will have either an fully or partially ON state or an OFF state. A combination of related pixels form an unit cell. For purposes of clarification, the unit cell will have a value that is selected from a group of more than two gray scale values, which is determined by the sum of full and fractional values of the constituent pixels.

As noted above the present invention is directed to a system using hybrid-tones to reproduce a gray scale image. The image to be produced is converted to gray scale image data by an image input terminal (IIT). The IIT can be either a scanner for reproduction or a personal computer for original creation. This gray scale image data is received by an image output terminal (IOT). The IOT converts the gray scale image data to an image on a document. This conversion can be carried out by many methods, including the electrophotographic and ionographic systems mentioned above. In other words, the gray scale image data is converted into either light pulses to dissipate charge from the photoreceptor or ion beam pulses to deposit charge onto the electroreceptor. It is this dissipating or depositing of charge that is the concern of this application and the present invention because the charge residing on the charge receptor at the development process dictates the image to be formed on the document. This charge forms what is referred to as the electrostatic or latent image.

The present invention is described in terms of charged area development (CAD). However, it is noted that one of ordinary skill in the art would realize that the concepts of the present invention are applicable to discharged area development (DAD) system.

The electrostatic image arises from the distribution of charge on the surface of the charge receptor. The charge distribution in a unit cell of gray level l/mxn is set by the sum for k=1 to l $Q(x,y)=\Sigma q_k(x,y: x_k, y_k)$.

The electrostatic fields in the development zone due to this charge distribution can be evaluated by a Fourier transform. The developability is defined as the integral of the normal components of the electrostatic field in the development zone. For a given gray level, the developability averaged over the unit cell is independent of the unit cell pattern shape. However, the maximum values, the minimum values, and the distribution vary with the pattern shape and the ratio of the charge receptor's thickness (L) to the unit cell size ($\lambda$). The average developability increases linearly with the gray level. However, the local value within the unit cell varies over a wide range which depends on the pattern type as well as the ratio $L/\lambda$.

Figure 3:
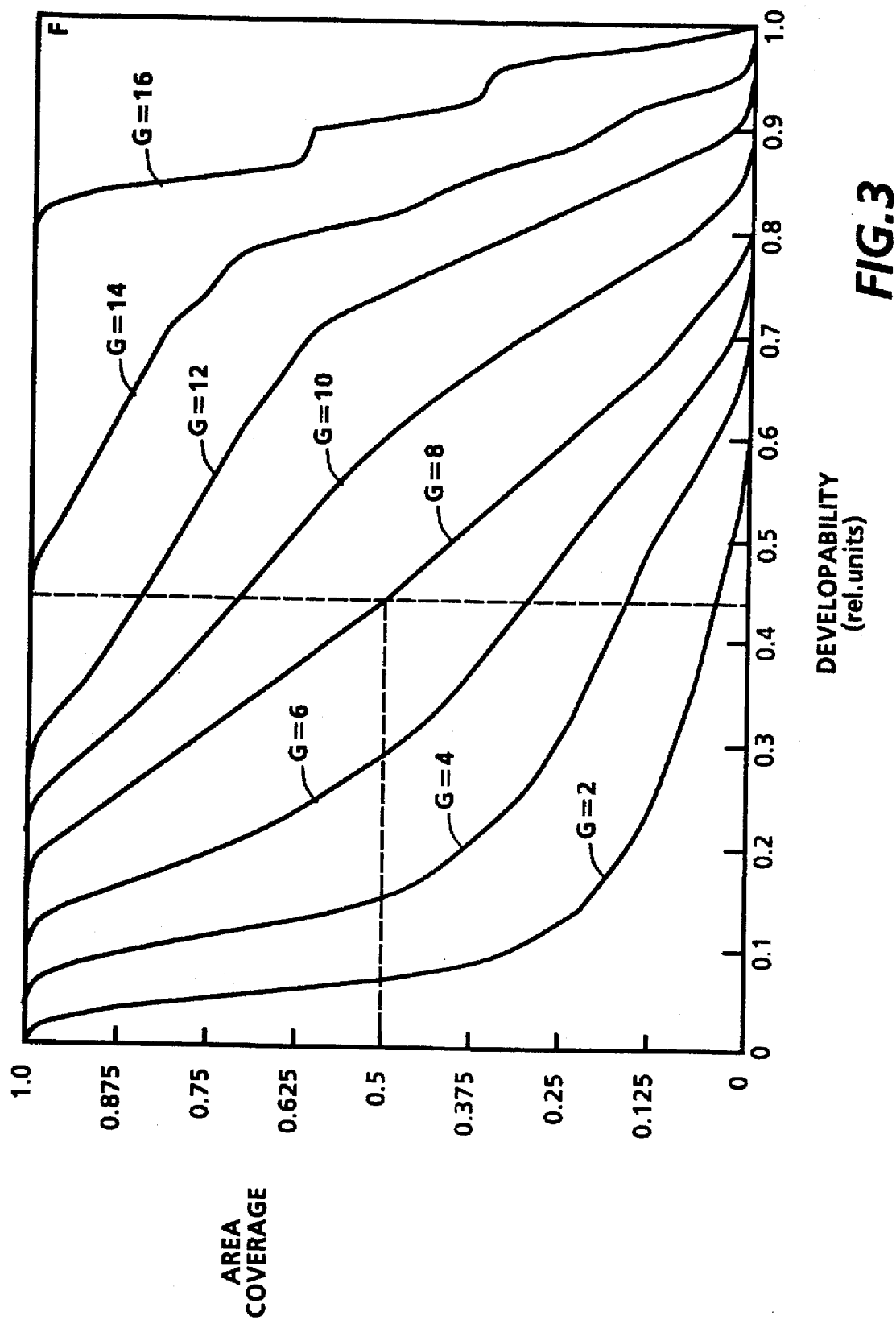
FIG. 3 illustrates a graph showing a relationship between gray level, developability, and area coverage for a chosen unit cell size to charge receptor thickness ratio.

FIG. 3 shows the fractional area of the unit cell where the developability is greater than the abscissa values, for gray levels 2/16, 4/16, 6/16, 8/16, 10/16, 12/16, 14/16, and 15/16 of a clustered (fattening) type pattern. In this Figure, the ratio of the charge receptor thickness to the unit cell size is $\lambda/L=5$. This graph shows the lack of linearity of gray scale reproduction, as explained below.

If the threshold development is chosen such that the 8/16 gray level (50 percent) is exactly reproduced as shown by the dashed lines, the intersections of the curves with the threshold line (vertical dashed line) represent the output area coverages for the different gray levels. In the case of FIG. 3, the output coverage for the lower gray levels (highlights) are smaller than expected, and the output coverage for the higher gray levels (shadows) are larger than expected. The extent of this nonlinearity between the output and the input gray levels varies with much sensitivity to the ratio of $\lambda/L$.

Figure 4:
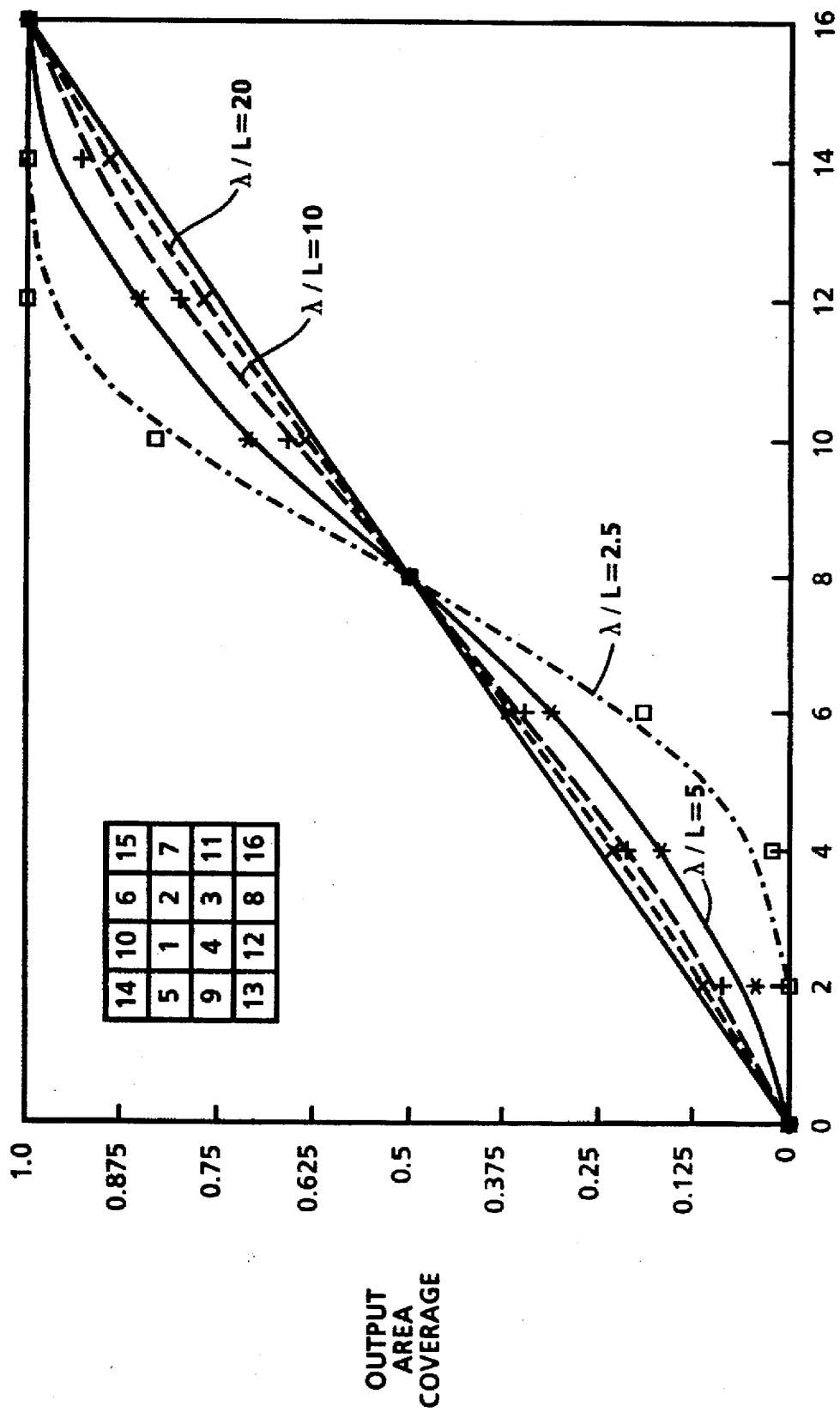
FIG. 4 illustrates a graph showing a relationship between gray level and output area coverage for particular unit cell size to charge receptor thickness ratios when utilizing a conventional half tone pattern.

FIG. 4 shows a plot of the output area coverage versus the input gray level attained from a plot similar to FIG. 3 for four $\lambda/L$ ratios. As shown in FIG. 4, the output area coverage becomes significantly non-linear with the input gray level when the ratio $\lambda/L$ decreases below about 10. Ideally, to reproduce a high quality gray scale image, it is desired that the output area coverage is linear with the input gray level. For a quantitative measure of this linearity, the slopes of the curves near 50 percent gray level are measured.

As demonstrated in FIG. 4, the curve showing the output coverage of the unit cell area versus the input gray level is S-shape for situations where the ratio of the unit cell size to the charge receptor thickness $\lambda/L$ is less than 10. The greater the curvature of the S-shape curve the greater the likelihood of highlights being washed out and shadows being overdeveloped.

For example, given a thickness of a charge receptor and a halftone unit cell consisting of 4×4 pixels, a faithful reproduction of gray scales requires the unit cell size $\lambda$ ($\lambda=4$ s, where s is the pixel size) to be larger than about 10 times the charge receptor's thickness L. In other words, for a typical charge receptor thickness of L=20 microns, a faithful gray reproduction is limited to a pixel size of s greater than or equal to 50 microns, a resolution lower than 500 spots per inch (spi). One way to increase the resolution while maintaining the quality of gray scale reproduction with a half tone method is to use a thinner charge receptor. However, the utilization of a thinner charge receptor poses too many engineering and manufacturing problems to make it practically feasible.

The reason behind the nonlinearity of the gray scale reproduction demonstrated above, is the fringe field effect that causes the same amount of charge in a succeeding ON pixel to produce a larger developability area coverage than the charge in the previous ON pixel. Thus, to increase the developability area coverage in proportion to the number of on pixels, the succeeding ON pixels should be given a smaller amount of charge.

One way of reducing the amount of charge for succeeding ON pixels is to vary the pulsewidth of the ion beam (for ionography) or light beam (for electrophotography). Moreover, the amount of charge for the succeeding ON pixels can be also managed by varying the intensity of the ion beam or light beam.

In a preferred embodiment of the present invention, the charge to be applied for succeeding ON pixels is managed by controlling the pulsewidth and not the intensity. More specifically, FIG. 1 illustrates a block diagram of a preferred embodiment of the present invention in which the pulsewidth of the ion or light beam being applied to the charge receptor is varied according to the pixel number of the unit cell and the gray level assigned to that unit cell. In FIG. 1, a charge manager 1 receives information concerning the gray level assigned to the unit cell as well as the pixel number of the unit cell presently being prepared to hold information corresponding to the latent image.

The charge manager 1 includes a pulsewidth controller 10 which is connected to a pulse generator 20. As will be explained later with respect to FIG. 2, the pulsewidth for a particular pixel within a unit cell is dependent upon the status of the preceding ON pixels within the unit cell. More specifically, the pulsewidth controller 10 receives the pixel number and the gray level information assigned to the unit cell and controls the pulse generator accordingly, such that the pulsewidth of the pulse generated by the pulse generator 20 corresponds to the relationship illustrated in FIG. 2.

To realize this charge management, the pulsewidth controller 10 may include a look-up table which has the pulsewidths prestored therein such that the pixel number information and gray level information are used as addresses to look up the proper pulsewidth to be generated by the pulse generator 20. On the other hand, the pulsewidth controller 10 can include a logic circuit which calculates the pulsewidth associated with the pixel number and the gray level assigned to the unit cell in accordance with predetermined algorithms.

The pulsewidth generator 20 produces a signal having a pulsewidth corresponding to the information generated by the pulsewidth controller 10. This signal is fed into an image formation unit 30 which converts the signal to an ion beam or light beam to change the charge state of the charge receptor 40. It is noted that the charge receptor 40 may be a photoreceptor in an electrophotographic system or an electroreceptor in an ionographic system.

Figure 10:
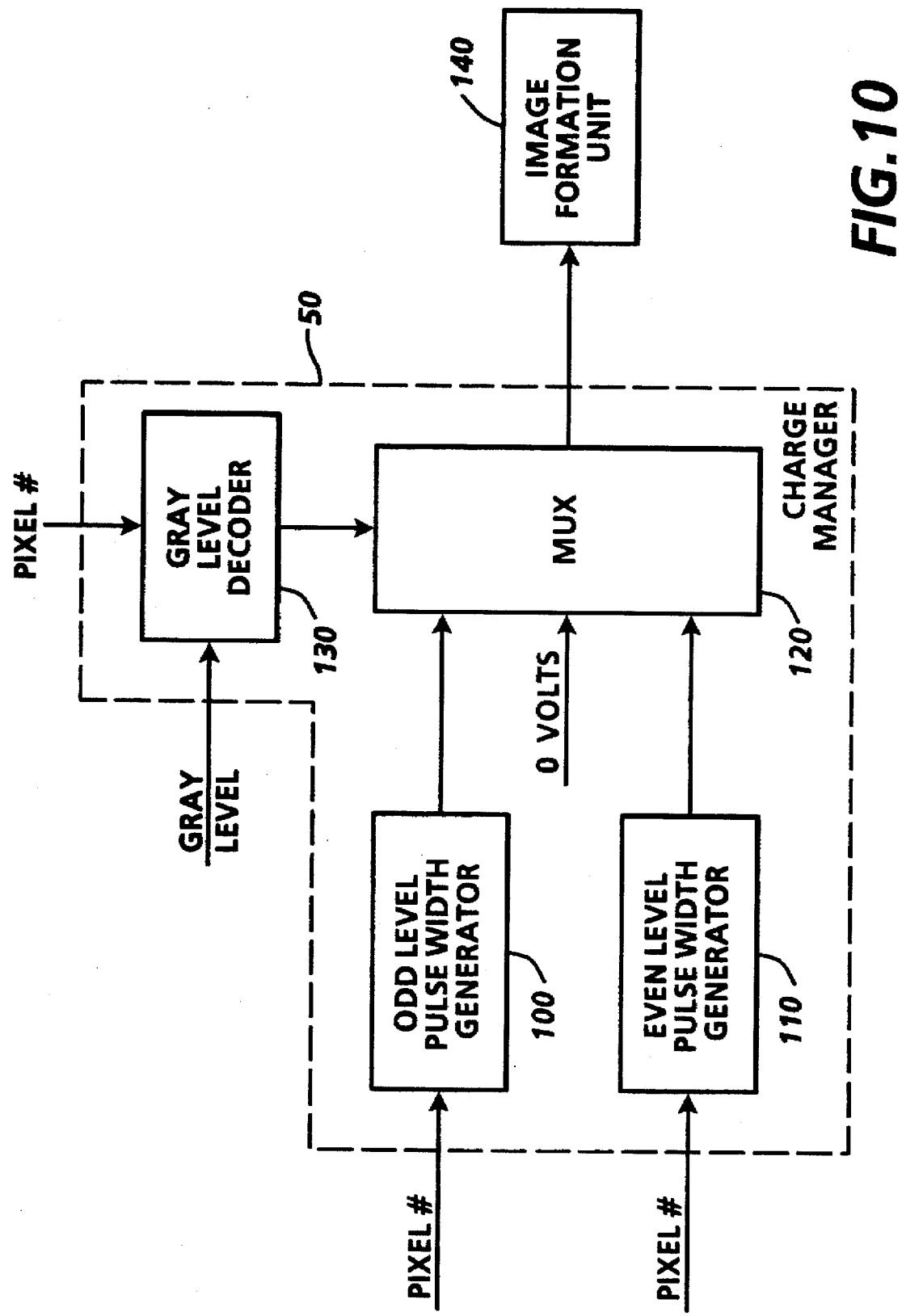
FIG. 10 illustrates a block diagram of a second embodiment of the present invention.

FIG. 10 illustrates another embodiment of the present invention wherein a charge manager 50 produces the control signals to be fed to an image formation unit 140. These controls signals are used ultimately to manage the charge on a charge receptor. In the charge manager 50, an odd level pulsewidth generator 100 and an even level pulsewidth generator 110 produce electric pulses having a pulsewidth corresponding to the pixel number of the unit cell being charged or discharged on the charge receptor.

The electric pulses generated by the odd level pulsewidth generator 100 and even level pulsewidth generator 110 are fed into a multiplexer 120 along with a zero signal. The zero signal does not have to be a voltage. The multiplexer 120 selects one of the three inputs according to control signals received from the gray level decoder 130. The gray level decoder 130 receives gray level information for the relative unit cell and the pixel number presently being charged or discharged on the charge receptor. The gray level decoder 130 decodes the gray level information and the pixel number information to produce the proper control signal so that the multiplexer 120 selects either the electric signal from the odd level pulsewidth generator 100, the electric signal from the even level pulsewidth generator 110, or the zero signal. Like the pulsewidth controller 10 of FIG. 1, the gray level decoder 130 may include a look-up table or a logic circuit to generate the control signals.

Figure 2:
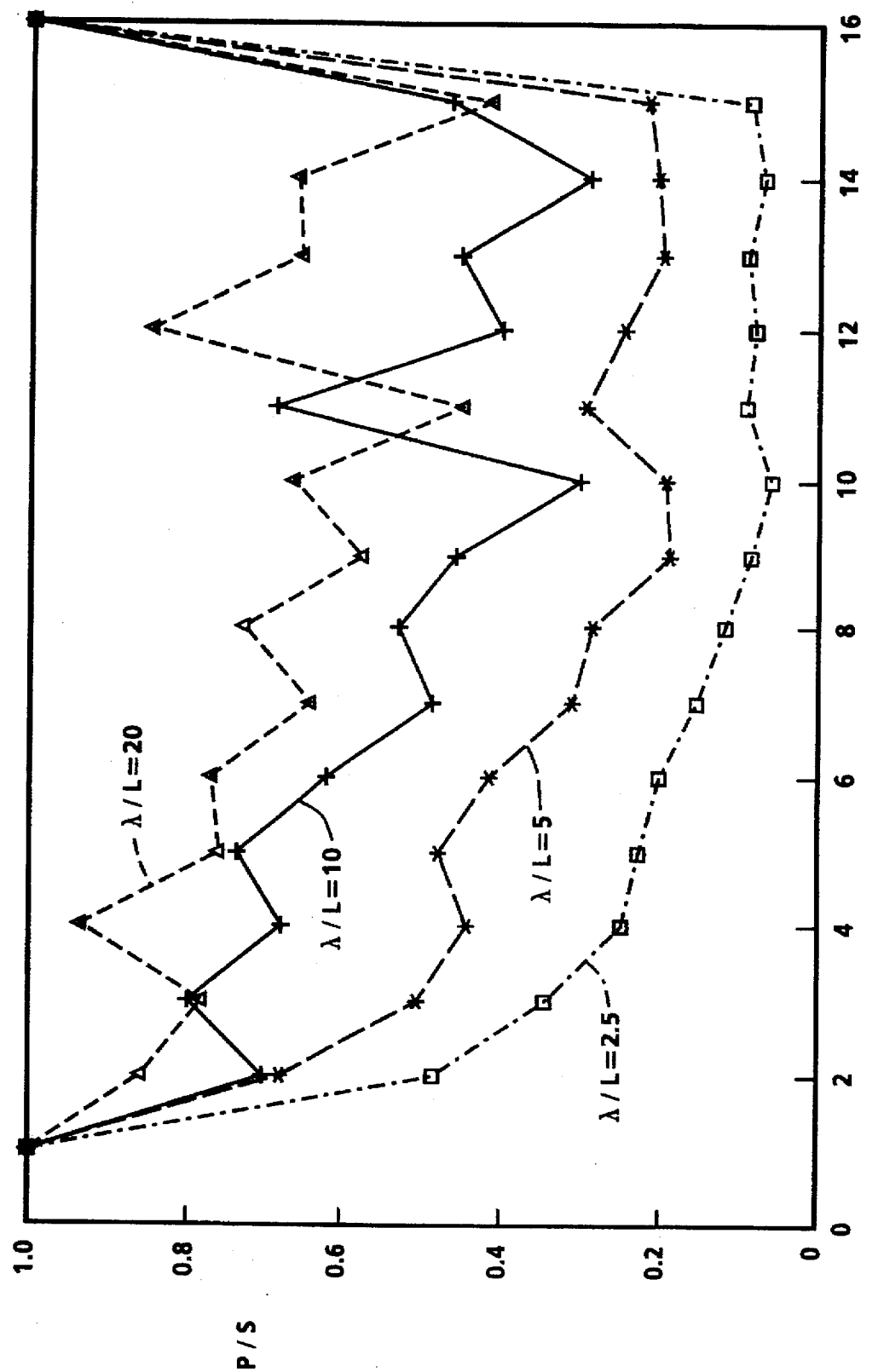
FIG. 2 illustrates a graph showing a relationship between pulsewidth/pixel size, unit cell size to charge receptor thickness ratio, and gray level as utilized in the present invention.

The selected electric signal is then inputted to the image formation 140 which produces either an electric field so that the proper amount of charge is deposited on the charge receptor or produces a light beam to dissipate the proper amount of charge from the charge receptor such that the charge resigning within the pixel corresponds the relationship illustrated in FIG. 2. In other words, the charge manager 50 manages the amount of charge to be deposited or dissipated from the charge receptor such that succeeding ON pixels have a lesser amount of charge corresponding thereto than the first ON pixel of the unit cell.

It is further noted that two separate pulsewidth generators are not needed to realize a gray scale generation that is greater than the gray scale defined by the number of pixels in the unit cell. For example, the embodiment of FIG. 1 can generate such a gray scale using a single pulse generator which is capable of generating the variety of pulsewidths needed to define the desired gray scale.

A brief description of the underlining principles and operations of the present invention will follow utilizing FIGS. 2–9.

FIG. 2 illustrates examples of the pulsewidths for the 16 pixels of a 4×4 half tone unit cell for various given $\lambda L$ ratios. It is noted that although FIG. 2 illustrates fractional values of the pulsewidth to be applied, the illustrated relationship corresponds directly to the relationship of the charge amount for different pixels in an unit cell. It is further noted that FIG. 2 illustrates values for the clustered or fattening type unit cell pattern. This clustered or fattening type pattern is illustrated in the inset of FIG. 4.

As can be seen from FIG. 2, the pulsewidth for the first ON pixel in the 4×4 unit cell is one. The pulsewidth of the succeeding ON pixels for this 4×4 pixel unit cell are reduced until the sixteenth succeeding ON pixel at which time the pulsewidth of the sixteenth ON pixel becomes equal to the pulsewidth of the first ON pixel.

An example of the application of this relationship to forming an unit cell with a gray level of 4/16 and $\lambda/L=2.5$ will be described to further clarify the concepts of the present invention. If an unit cell is assigned a gray level of 4/16, the unit cell will have four of sixteen pixels assigned to the ON state. In this case, the first ON pixel will be assigned a full charge amount. The second ON pixel will be assigned a 0.5 charge amount relative to the full charge amount of the first ON pixel. The third ON pixel will be assigned a 0.35 charge amount relative to the full charge amount of the first ON pixel. Lastly, the fourth ON pixel will be assigned a 0.22 charge amount relative to the full charge amount of the first ON pixel. In one preferred embodiment of the present invention, this charge management is realized through the varying of the pulsewidth of the electric signal being applied to the charge receptor in the relationship manner as described above. It is noted that the above values are approximate and can be optimized using the formula described below.

By managing the amount of charge for individual pixels on the charge receptor in this manner, the fringe field effect that causes the same amount of charge for the succeeding ON pixels to produce a larger developability area coverage than the charge of the previous ON pixel can be reduced. This type of management system allows the digital marking engine to enhance the faithfulness of the gray scale reproduction for any given $\lambda/L$ ratio such that a very high resolution can be produced without reducing the thickness of the charge receptor.

Although FIG. 2 illustrates specific pulsewidths for succeeding ON pixels, these pulsewidths are assumed to be directly proportional to the amount of charge that should be present in succeeding ON pixel areas. Thus, one of ordinary skill in the art would realize that this graph clearly illustrates the charge amount relationship between ON pixels; and therefore, this relationship for pulsewidths can be applied for both ion beam and light beam pulses. Moreover, although FIG. 2 illustrates specific charge amounts for a 4×4 unit cell for a given ratio of unit cell size to charge receptor thickness, the values for determining the charge amount relationship are governed by the following explanation.

As noted above, the latent electrostatic images arise from the surface charge distribution. The charge contributed by the pixel centered at $(x_i, y_i)$ is created by scanning a beam of charge having a Gaussian distribution with the $1/e^2$ width equal to $w_x$ and $w_y$ in the x and y directions, respectively, from $x_i-p_i/2$ to $x_i+p_i/2$, where $p_i$ is a spatial pulsewidth (pulse time × scan speed).

$$Q_i(x,y;x_i,y_i,p_i) = \exp[-8(y-y_i)^2/w_y^2] \int_{x_i-p_i/2}^{x_i+p_i/2} \exp[-8(x-\xi)^2/w_x^2]d\xi =$$

$$(w_x/4)(\Pi)^{1/2}\exp[-8(y-y_i)^2/w_y^2][erfc(x_{1i}) - erfc(x_{2i})]$$

where erfc(x) is the complementary error function, and $$x_{1i}=2(2)^{1/2}(x-x_1-p_i/2)/w_x$$

$$x_{2i}=2(2)^{1/2}(x-x_1+p_i/2)/w_x$$

The pixel size is defined as the beam diameter in the scan direction where $s=w_x$. If the charge density at the pixel center $(x_i, y_i)$ when the pulsewidth $p_i$ is equal to the pixel size s, is normalized to unity, then, $$Q_i(x,y;x_i,y_i,p_i)=\exp[-8(y-y_i)^2/w_y^2][erfc(x_{1i})-erfc(x_{2i})]/[erfc(-(2)^{1/2})-erfc((2)^{1/2})]$$

It can be shown by numerical integrations that the total charge from this pixel is proportional to the pulsewidth $p_i$:

$$\int_{-\infty}^{\infty}\int Q_i(x,y;x_i,y_i,p_i)dxdy = (p_i/s)\int_{-\infty}^{\infty}\int Q_i(x,y;x_i,y_i,s)dxdy$$

Thus, the ratio $p_i/s$ can be used to specify the gray level.

The total charge distribution for a unit cell is given by the sum of the individual contributions from each pixel within a 4×4 unit cell. This total charge distribution can be read as $Q(x,y)=\pi Q_i(x,y;x_i,y_i,p_i)$.

The latent electrostatic image density, the developability D(x,y), is defined as the integral of the normal component of the electrostatic field in the development zone. This definition of developability coincides with the conventional practice of characterizing development by potentials rather than by fields.

The developability D(x,y) due to the total charge distribution Q(x,y) is calculated by the Fourier transform. The developabilities at N×N (typically, N=32) grid positions in a 4×4 pixel hybrid-tone pattern are calculated. The functional area coverage $C_{out}$ of the unit cell, where the developability is greater than a certain value D is calculated. Plotting the actual area coverage $C_{out}$ versus the developability D for each gray level pattern yields curves as shown in FIG. 3. These curves are obtained for half-tone patterns of clustered or fattening type with gray levels equal to even multiples of $1/16$.

If the threshold of development is chosen such that the $8/16$ gray level (50%) is exactly reproduced (as shown by the vertical dashed line), the intersections of the other curves with the vertical dashed line represent the effective output area coverage for those gray levels. It can be seen that in this example, (FIG. 3), where the ratio of the unit cell size to the charge receptor's thickness is $\lambda/L=5$, the output coverage for the lower gray levels (highlight) are smaller, and those for higher gray levels (shadow) are larger than expected.

Due to the fringe field effect, the developability D at a position $(x_i,y_i)$ is not determined by the charge density at $(x_i,y_i)$ alone, but by the total charge distribution Q(x,y). This is best illustrated with the one dimensional example of a half-tone (binary) 4×1 unit cell shown in FIGS. 5–8.

Figure 5:
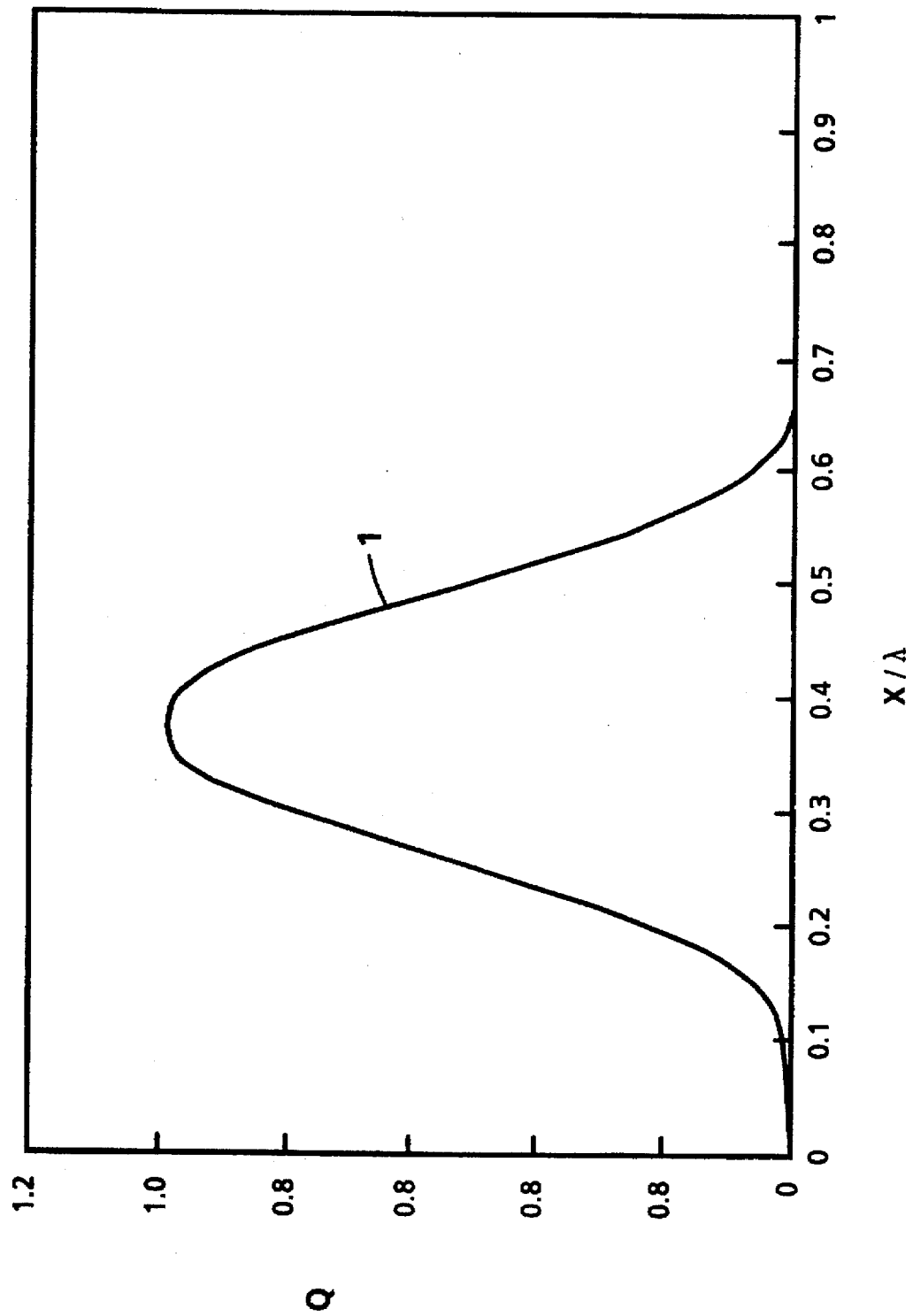
FIG. 5 illustrates a graph showing a relationship between a charge of a unit cell and a location of the charge within that unit cell for a gray level of 25 percent in a 4×1 pixel unit cell.
Figure 6:
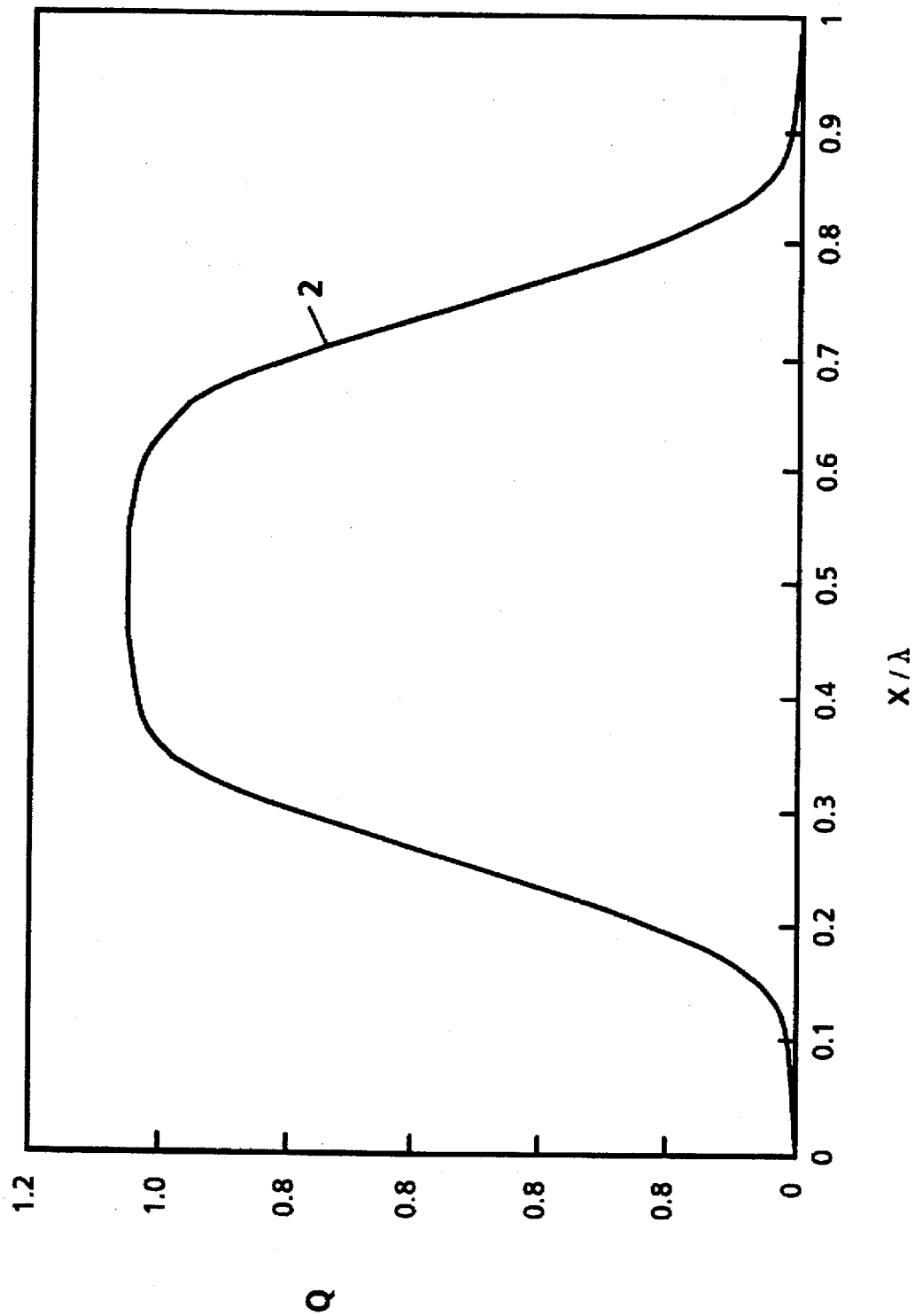
FIG. 6 illustrates a graph showing a relationship between a charge of a unit cell and a location of the charge within that unit cell for a gray level of 50 percent in a 4×1 pixel unit cell.
Figure 7:
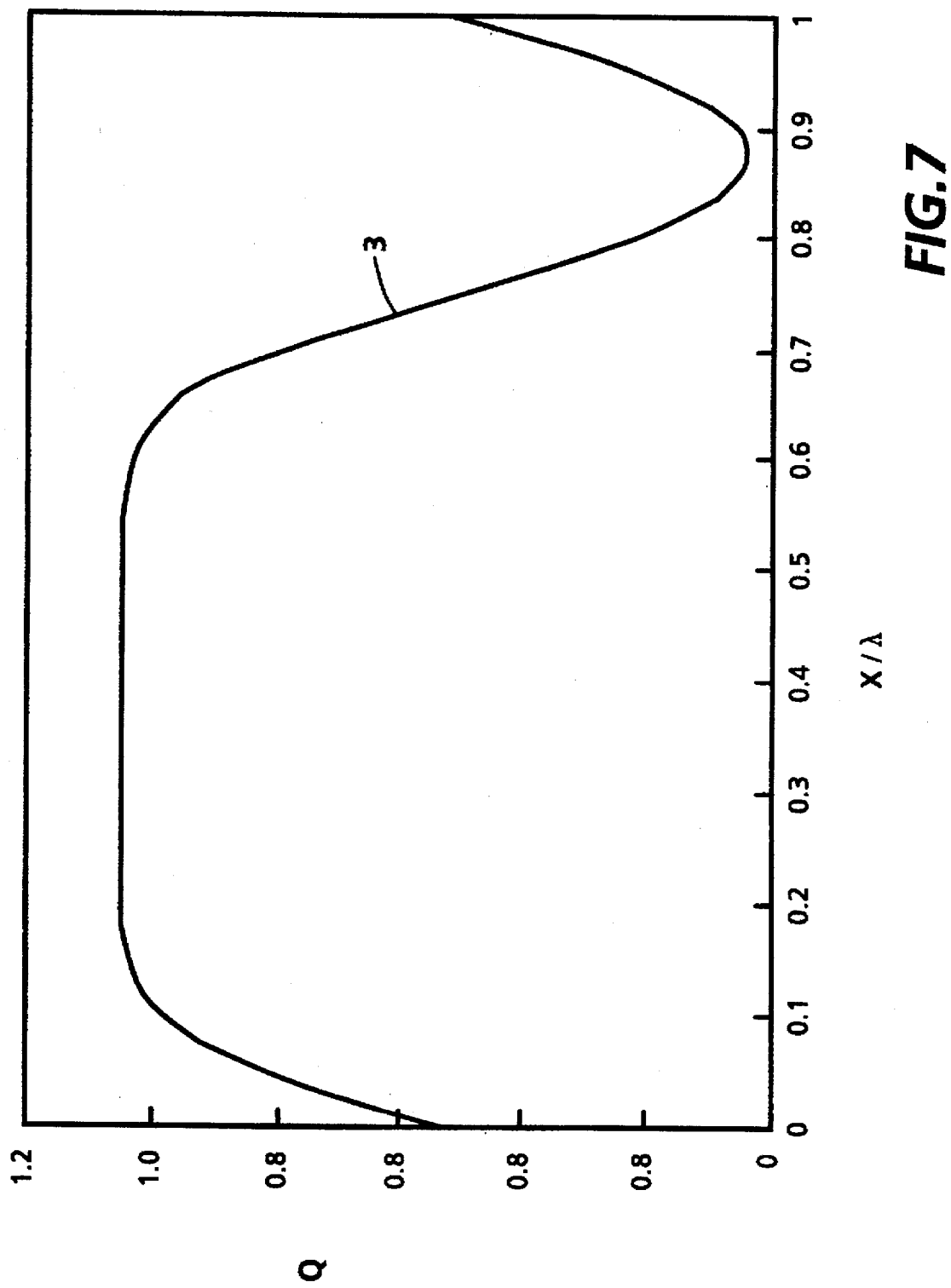
FIG. 7 illustrates a graph showing a relationship between a charge of a unit cell and a location of the charge within that unit cell for a gray level of 75 percent in a 4×1 pixel unit cell.
Figure 8:
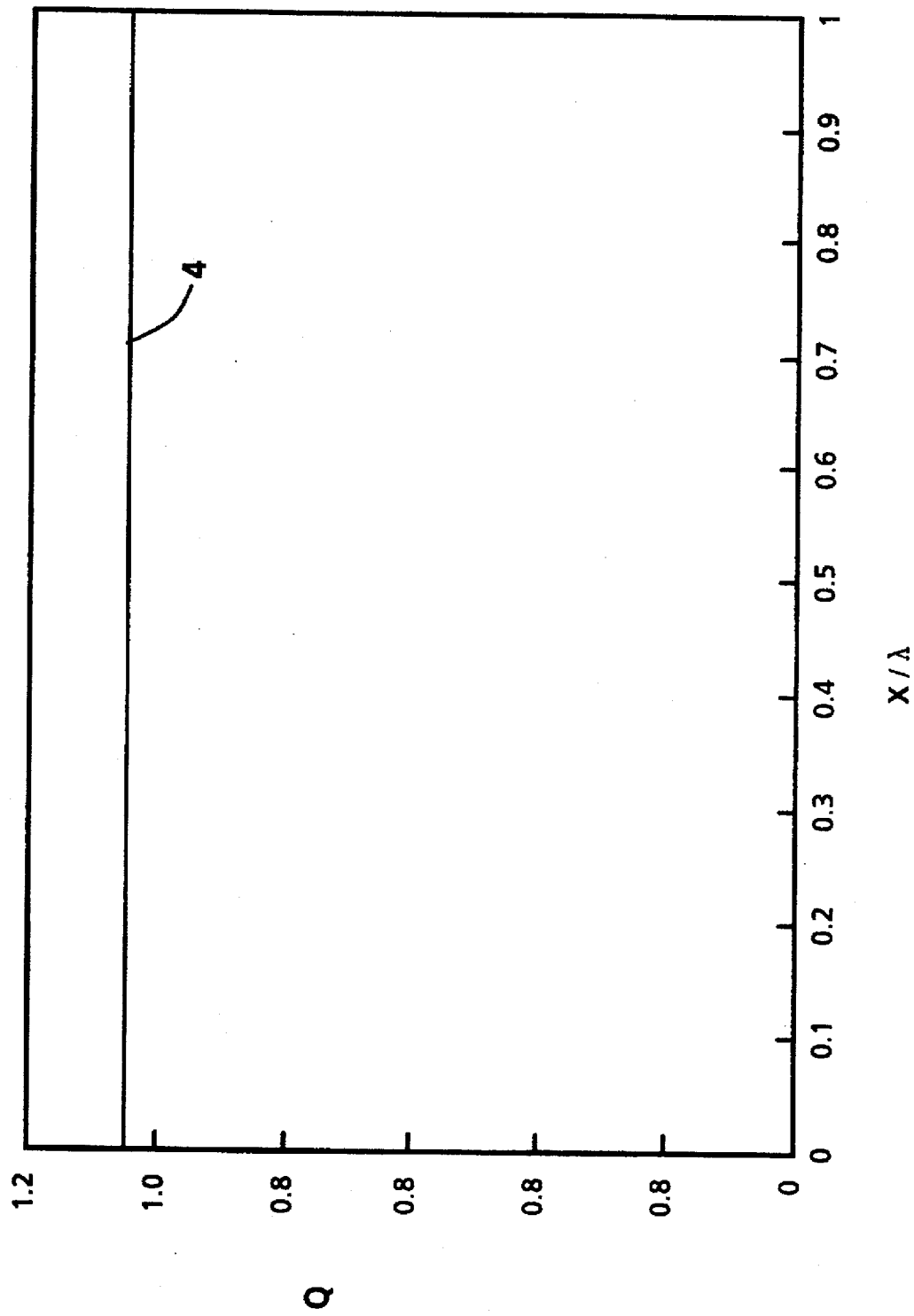
FIG. 8 illustrates a graph showing a relationship between a charge of a unit cell and a location of the charge within that unit cell for a gray level of 100 percent in a 4×1 pixel unit cell.

FIGS. 5–8 show the charge distribution along the scan line. More specifically, FIG. 5 shows the case where the gray level is 25 percent. FIG. 6 shows the situation where the gray level is 50 percent. FIG. 7 shows the situation where the gray level is 75 percent. FIG. 8 shows the situation where the gray level is 100 percent. In other words, the number of ON pixels within the unit cell are 1, 2, 3, and 4, respectively, for FIGS. 5–8.

Figure 9:
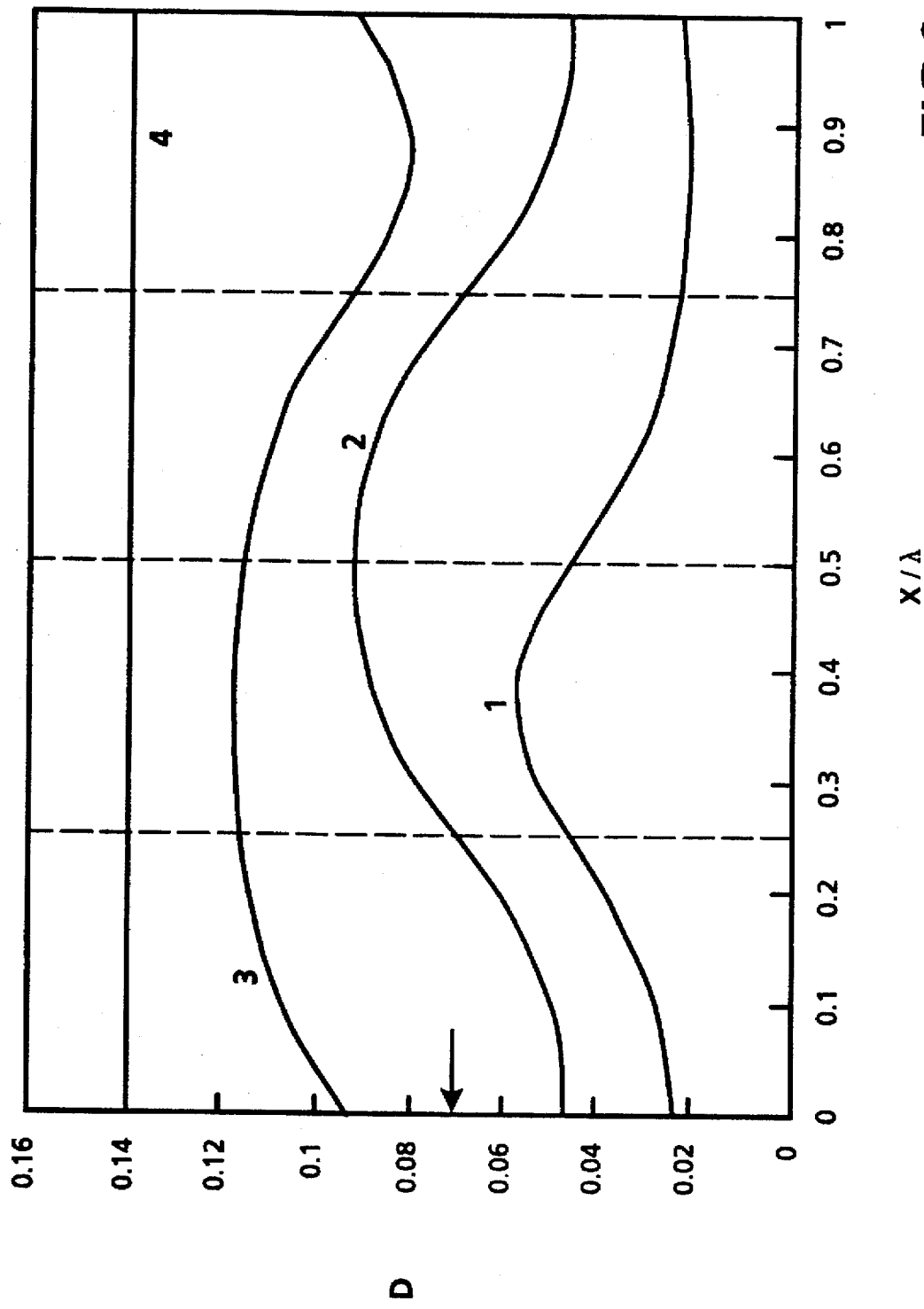
FIG. 9 illustrates a relationship between developability of individual unit cell with respect to location within the unit cell for the corresponding curves illustrated in FIGS. 5–8.

The developability distributions due to the charge distributions are shown in FIG. 9 for the situation where the unit cell size is two and a half times greater than the charge receptor's thickness. FIGS. 5–8 show that the charge densities in certain locations are not affected by turning ON additional pixels. However, FIG. 9 illustrates that even though in the locations where the charge densities are not affected by turning ON additional pixels, the developabilities of these locations differs significantly. For example, at $x/\lambda=0.5$, the charge densities are identical for 2, 3, and 4 ON pixels, yet the developabilities, in relative units, are 0.093, 0.116, and 0.14, respectively.

If the development threshold is chosen such that the 50 percent gray is exactly reproduced, as shown by the arrow in FIG. 9, the 25 percent gray level is washed out, while the 75 percent gray appears to be 100 percent black. It is noted that no other choices of the threshold developability yields any better reproduction for the four gray levels.

From this one-dimensional example, FIGS. 5–9 illustrate that due to the fringe field effect, the same amount of charge in succeeding ON pixels produces a larger developability area coverage than the charge in the previous ON pixel. Thus, to increase the developability area coverage in proportion to the number of ON pixels, the present invention manages the charge amount of succeeding ON pixels to be a smaller amount than the first ON pixel. As discussed above, one preferred embodiment manages the amount of charge given to succeeding ON pixels by reducing the pulsewidth of ion or light beam.

With respect to the preferred embodiments of the present invention, the actual values corresponding to the amount of charge for the succeeding ON pixels can be determined, using 4×4=16 level as an example, as follows:

First, the developability distribution for the unit cell of a single ON pixel with the chosen charge amount is calculated. The results are used to evaluate the output area coverage as a function of threshold developability as described in connection with FIG. 3. The threshold developability $D_{th}$ which yields an output coverage for a pattern as close as possible to 1/16 can then be determined. Next, the developability distribution of the unit cells for 2/16 is calculated with the charge amount chosen above in pixel 1, and the charge amount for the second pixel value is adjusted such that the output area coverage at $D_{th}$ is close enough to 2/16. This is repeated for 3/16, 4/16, etc., until all 16 values for the 16 pixels are determined. Although this procedure can be carried out in real time in a digital marking engine, the same procedure can be used to precalculate the values which are stored in a look-up table within the digital marking engine. Furthermore, this computational method of determining charge amount in successive pixels can be carried out empirically with a given charge receptor by following the same procedure.

This application of hybrid-tone method can also be adapted to the case where the number of gray levels is larger than the number of pixels per unit cell. For example, to obtain 32 gray levels with a 4×4 pixel unit cell, 32 different pulsewidths would be assigned to the 16 pixels. For the i-th pixel, the odd level pulsewidth $p_{io}$, and the even level pulsewidth $p_{ie}$ are determined as described above such that the output area coverage is exactly reproduced. The only difference in this situation, where a 32 level gray scale is used for a 4×4 pixel unit cell, is that the odd level pulsewidth $p_{io}$ is only used in the pixel of the unit cell corresponding to an odd numbered gray level; i.e., 1/32, 3/32, 5/32, 7/32, etc. On the other hand, the even level pulsewidth $p_{ie}$ is used in all pixels associated with a full $16^{th}$ gray level of the unit cell.

Figure 11:
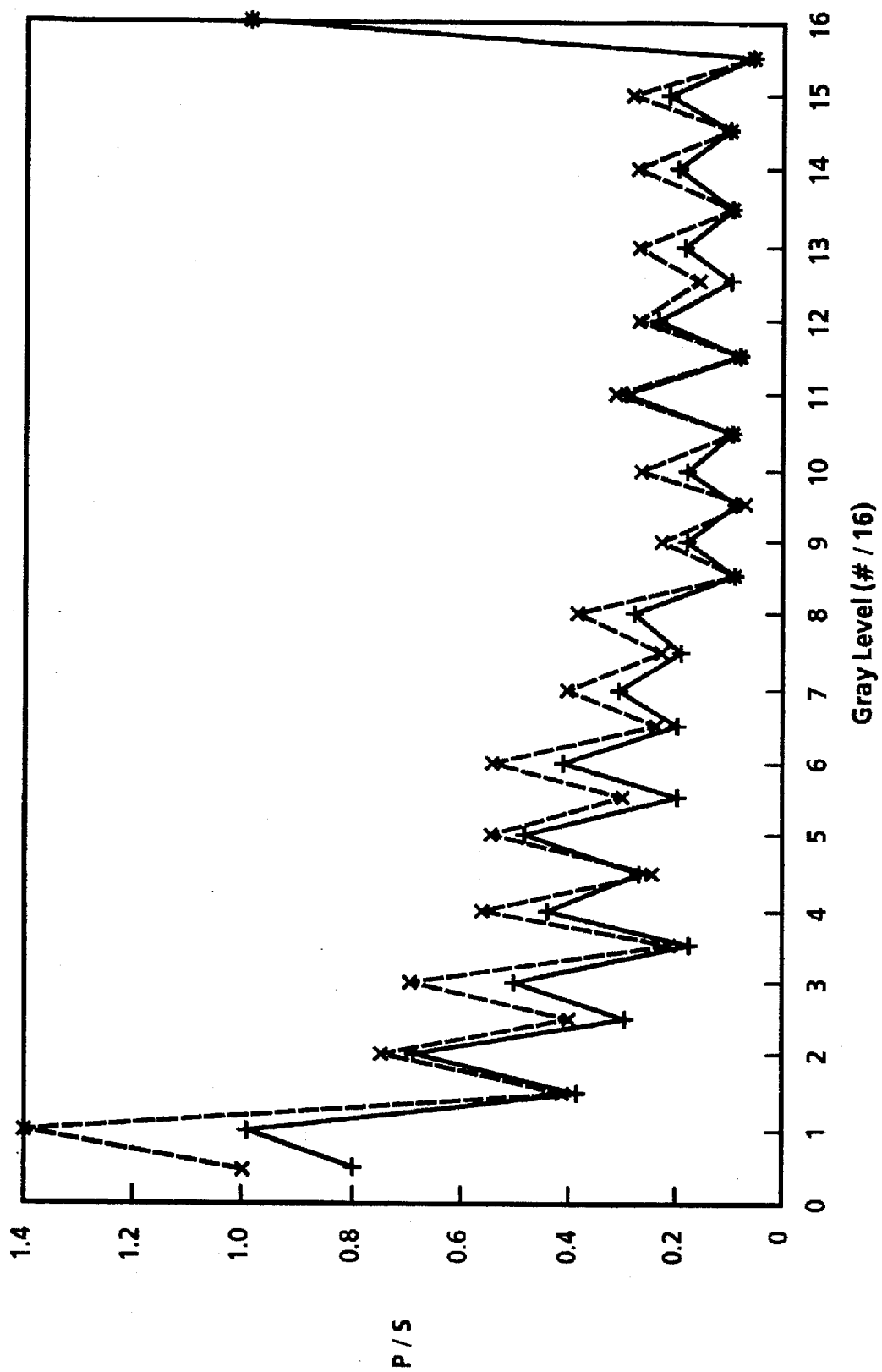
FIG. 11 illustrates a graph showing a relationship between pulsewidth/pixel size and gray level for a particular unit cell size to charge receptor thickness ratio as utilized in the second embodiment of the present invention illustrated in FIG. 10.

For example, FIG. 11 demonstrates the utilization of two separate pulsewidths per pixel to generate a 32 level gray scale for a unit cell of 4×4 pixels in a charged area development (CAD) system. In FIG. 11, the solid line represents a set of pulsewidths generated with the first even level pulse (for gray scale 1/16) equal to unity, and the dotted line represents another set in which the first odd level pulsewidth (for gray scale 1/32) has the value unity. In the first embodiment (solid line), if the gray level for the unit cell is 1/32, the first odd level pulsewidth, equal to 0.8, is applied to the first pixel within the 4×4 pixel unit cell. Furthermore, if the gray level for the unit cell is equal to 1/16, the first even level pulsewidth, equal to 1, is applied to the first pixel in the unit cell. However, if the gray level for the unit cell is 7/32, the first three pixels of the unit cell would receive even level pulsewidths of 1, 0.7, and 0.5, respectively. In other words, the first three pixels would account for 6 levels of the 7 levels in the 32 level gray scale. In the fourth pixel, the odd level pulsewidth of 0.2 would be applied to the fourth pixel in the unit cell. In this way, the unit cell would have a gray level of 7/32.

Figure 12:
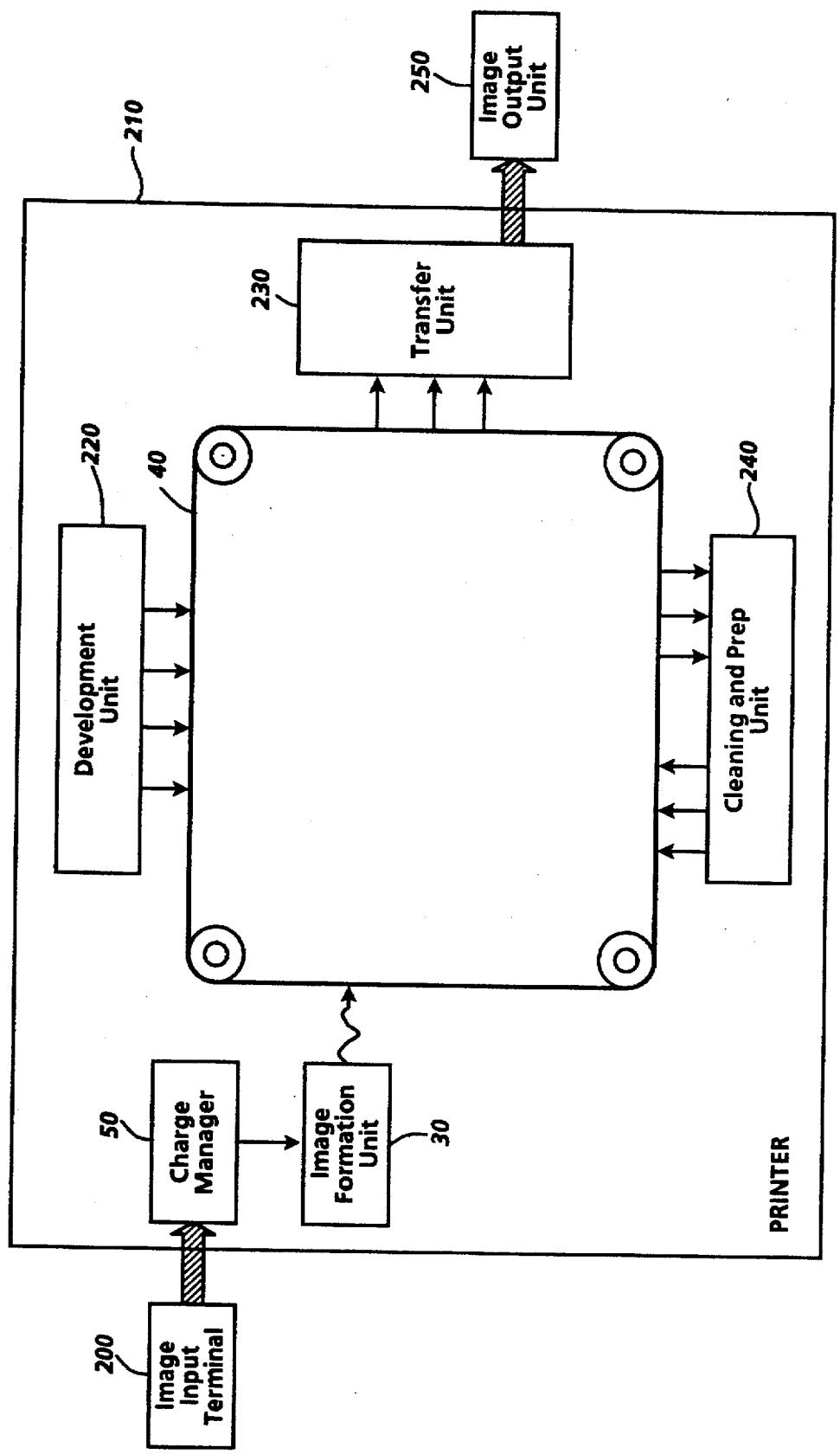
FIG. 12 illustrates a block diagram of a printing system utilizing the concepts of the present invention.

FIG. 12 illustrates the utilization of the concepts of the present invention in a printer system. In FIG. 12, image data is inputted to a printer 210 from an image input terminal (IIT) 200. The IIT 200 can be a scanner, personal computer, workstation on a network, or a file server on a network. The image data is fed into a charge manager 50. The charge manager 50 can be either the manager illustrated in FIG. 1 or FIG. 10. For the sake of brevity, the manager of FIG. 1 will be used to describe this embodiment of the present invention.

The charge manager 50 receives information concerning the gray level assigned to an unit cell as well as the pixel number of the unit cell presently being prepared to hold information corresponding to the latent image. The charge manager 50 includes a pulsewidth controller 10 which is connected to a pulse generator 20. The pulsewidth for a particular pixel within a unit cell is dependent upon the status of the preceding ON pixels within the unit cell. More specifically, the pulsewidth controller 10 receives the pixel number and the gray level information assigned to the unit cell and controls the pulse generator accordingly, such that the pulsewidth of the pulse generated by the pulse generator 20 corresponds to the charge amount relationship illustrated in FIG. 2.

To realize this charge management, the pulsewidth controller 10 may include a look-up table which has the pulsewidths prestored therein such that the pixel number information and gray level information are used as addresses to look up the proper pulsewidth to be generated by the pulse generator 20. On the other hand, the pulsewidth controller 10 can include a logic circuit which calculates the pulsewidth associated with the pixel number and the gray level assigned to the unit cell in accordance with predetermined algorithms.

The pulsewidth generator 20 produces an electric pulse having a pulsewidth corresponding to the information generated by the pulsewidth controller 10. This electric pulse is fed into an image formation unit 30 which converts the electric pulse to a laser beam pulse or ion beam pulse to modulate the charge distribution on the charge receptor 40. As a result, the residual charge on the charge receptor 40 at that pixel is equal to the amount of charge determined by the relationship illustrated in FIG. 2. It is noted that the charge receptor 40 may be a photoreceptor in electrophotography or an electroreceptor in ionography.

Once the latent image is formed on the charge receptor 40 by the image formation unit 30, the latent image is moved to a development area where a development unit 220 deposits toner which attaches to the discharged area. The developed area is moved to a transfer area where a transfer unit 230 transfers the toner to a sheet and fuses the toner thereon. The sheet with the fused image is transferred to an image output unit 250. Lastly the charge receptor is cleaned and prepped by a cleaning and prep unit 240 before being processed again by the image formation unit 30.

Although the present invention has been described in detail above, various modifications can be implemented without imparting from the spirit. For example, the present invention is not limited to a 4×4 pixel unit cell, but any size unit cell can be utilized.

Moreover, the present invention can be utilized to realize a gray scale greater than two times the number of the unit cell by adding additional pulsewidths corresponding to the additional levels of the gray scale. For example, a 64 level gray scale could be utilized using a set of quarter pulsewidths, half pulsewidths, and full pulsewidths. The pulsewidth generator would generate the proper electrical pulses such that the overall concept of the present invention of having the succeeding ON pixels within a unit cell having a charge amount residing within that pixel to be different from the charge amount associated with the first ON pixel of the unit cell.

Also, the purpose of the present invention can also be utilized by varying the intensity of the light beam or ion beam in the same sense so as to manage the charge within a unit cell. Such variations can be realized within the scope of the present invention wherein the modifications realize the same basic concept of compensating for the charge associated with preceding ON pixels of the unit cell in succeeding ON pixels, thereby reducing the affect of electrostatic forces associated with the preceding ON pixel upon the developability of succeeding ON pixels.

Lastly, although the present invention has been described using a charge area development (CAD) system, the present invention is also applicable to a discharge area development (DAD) system. Moreover, both electrophotographic (laser printing) and ionographic systems can be applied in either write-white or write-black modes. In electrophotography, one can use either write-white followed by CAD, or write-black followed by DAD. In ionography, write-black is followed by CAD, and write-white is followed by DAD. However, if a uniformly precharged electroreceptor is used, ionography can be applied with write-black followed by DAD, and write-white followed by CAD. The present invention is applicable to all modes, in principle, with minor changes in the charge values being necessary.

While the invention has been described with reference to various embodiments disclosed above, it is not confined to the details set forth above, but is intended to cover such modifications or changes which may come within the scope of the attached claims.

What is claimed is:

1. A method for managing charge distribution during formation of a latent image on a charge receptor in accordance with a generated gray scale value for a unit cell, comprising the steps of;
  (a) establishing a reference amount of charge to be located in each individual ON pixel area of the unit cell on the charge receptor, and
  (b) compensating the reference amount of charge for a succeeding ON pixel area based on the charge present in a preceding ON pixel area;
  said step (b) including the substeps of:
    (b1) setting the amount of charge for a first ON pixel in the unit cell to the reference amount; and
    (b2) setting an amount of charge corresponding to a succeeding ON pixel in the unit cell to an amount which is less than the reference amount.

2. The method as claimed in claim 1, wherein:
  said step (b1) comprises the substep of generating a reference amount of light to be incidence upon the ON pixel areas, the reference amount of light corresponding the reference amount of charge to be located in each individual ON pixel area of the unit cell; and
  said substep (b2) comprises the substep of modifying the reference amount of light to be applied in the succeeding ON pixel area of the unit cell.

3. The method as claimed in claim 2, wherein said substep (b2) comprises the substep of modifying the reference amount of light for succeeding ON pixel areas of the unit cell by controlling a length of time that the light is applied to an ON pixel area.

4. The method as claimed in claim 2, wherein said substep (b2) comprises the substep of modifying the reference amount of light for succeeding ON pixel areas of the unit cell according to a gray scale which is greater than a gray scale defined by a number of pixels in the unit cell.

5. The method as claimed in claim 1, wherein:
  said step (a) comprises the substep of generating a reference amount of ion charge to be deposited upon the ON pixel areas, the reference amount of ion charge corresponding the reference amount of charge to be located in the individual ON pixel area of the unit cell; and
  said substep (b2) comprises the substep of modifying the reference amount of ion charge to be applied in the succeeding ON pixel area of the unit cell.

6. The method as claimed in claim 5, wherein said substep (b2) comprises the substep of modifying the reference amount of ion charge for succeeding ON pixel areas of the unit cell by controlling a length of time that the ion charge is applied to an ON pixel area.

7. The method as claimed in claim 5, wherein said substep (b2) comprises the substep of modifying the reference amount of ion charge for succeeding ON pixel areas of the unit cell according to a gray scale which is greater than a gray scale defined by a number of pixels in the unit cell.

8. A system for managing charge distribution during formation of a latent image on a charge receptor in accordance with a generated gray scale value for a unit cell, comprising:
  charge formation means for establishing a reference amount of charge to be located in each individual ON pixel area of the unit cell on the charge receptor; and
  compensation means for compensating the reference amount of charge for a succeeding ON pixel area based on the charge present in a preceding ON pixel area;
  said compensation means setting the amount of charge for a first ON pixel in the unit cell to the reference amount and setting an amount of charge corresponding to a succeeding ON pixel in the unit cell to an amount which is less than the reference amount.

9. The system as claimed in claim 8, wherein:
  said charge formation means generates a reference amount of light to be incidence upon the ON pixel areas, the reference amount of light corresponding to the reference amount of charge to be located in the individual ON pixel area of the unit cell; and
  said compensation means modifies the reference amount of light to be applied in the succeeding ON pixel area in the unit cell.

10. The system as claimed in claim 9, wherein said compensation means controls a length of time that the light is applied to an ON pixel area.

11. The system as claimed in claim 9, wherein said compensation means modifies the reference amount of light for succeeding ON pixel areas according to a gray scale which is greater than a gray scale defined by a number of pixels in the unit cell.

12. The system as claimed in claim 8, wherein:
  said charge formation means generates a reference amount of ion charge to be deposited upon the ON pixel areas in the unit cell, the reference amount of ion charge corresponding to the reference amount of charge; and
  said compensation means modifies the reference amount of ion charge to be applied in the succeeding ON pixel area in the unit cell.

13. The system as claimed in claim 12, wherein said compensation means controls a length of time that the ion charge is applied to an ON pixel area.

14. The system as claimed in claim 12, wherein said compensation means modifies the reference amount of ion charge for succeeding ON pixel areas in the unit cell according to a gray scale which is greater than a gray scale defined by a number of pixels in the unit cell.

15. The system as claimed in claim 13, further comprising:
  light means for applying light to ON pixel areas such that an amount of charge remaining in an individual pixel area equals the charge value established by said charge management means for that pixel area.

16. The system as claimed in claim 15, wherein said light means changes the amount of light to be applied in succeeding ON pixel areas by controlling a length of time that the light is applied to the pixel area, the length of time increasing as the charge value decreases.

17. The system as claimed in claim 16, wherein said light means changes the amount of light to be applied in succeeding ON pixel areas according to a gray scale which is greater than a gray scale defined by a number of pixels in the unit cell.

18. A method for managing charge distribution of a latent gray scale image on a charge receptor, comprising the steps of:
   (a) generating a gray scale value for a unit cell having at least two pixels; and
   (b) establishing a charge value for each individual pixel of the unit cell corresponding to the generated gray scale value, the charge value for a first ON pixel in the unit cell being assigned a unit charge value, a charge value corresponding to succeeding ON pixels having a value which is less than the unit charge value assigned to the first ON pixel.

19. The method as claimed in claim 18, further comprising the step of:
   (c) applying ion charges to ON pixel areas such that the charge value deposited in an individual pixel area equals the charge value established in said step (b) for that pixel area.

20. The method as claimed in claim 19, wherein said step (c) comprises the substep of changing the charge value to be deposited in succeeding ON pixel areas by controlling a length of time that the ion charge is applied, the length of time decreasing as the charge value decreases.

21. The method as claimed in claim 20, wherein said step (c) comprise the substep of modifying the charge value to be deposited in succeeding ON pixel areas according to a gray scale which is greater than a gray scale defined by a number of pixels in the unit cell.

22. The method as claimed in claim 18, further comprising the step of:
   (c) applying light to ON pixel areas such that the charge value remaining in an individual pixel area equals the charge value established in said step (b) for that pixel area.

23. The method as claimed in claim 22, wherein said step (c) comprises the substep of changing the amount of light to be applied in succeeding ON pixel areas by controlling a length of time that the light is applied, the length of time increasing as the charge value decreases.

24. The method as claimed in claim 20, wherein said step (c) comprises the substep of modifying the amount of light to be applied in succeeding ON pixel areas according to a gray scale which is greater than a gray scale defined by a number of pixels in the unit cell.

25. A system for managing charge distribution of a latent gray scale image on a charge receptor, comprising:
   gray scale generating means for generating a gray scale value for a unit cell having at least two pixels; and
   charge management means for establishing a charge value for each individual pixel of the unit cell corresponding to the generated gray scale value, the charge value for a first ON pixel in the unit cell being assigned a unit charge value, a charge value corresponding to succeeding ON pixels having a value which is less than the unit charge value assigned to the first ON pixel.

26. The system as claimed in claim 25, further comprising:
   charging means for electrically charging ON pixel areas, within the unit cell, on the charge receptor such that an amount of charge deposited in an individual pixel area equals the charge value established by said charge management means for that pixel area.

27. The system as claimed in claim 26, wherein said charging means changes the amount of charge to be deposited in succeeding ON pixel areas by controlling a length of time that an electrical charge is applied to the pixel area, the length of time decreasing as the charge value decreases.

28. The system as claimed in claim 27, wherein said charging means changes the amount of charge to be deposited in succeeding ON pixel areas according to a gray scale which is greater than a gray scale defined by a number of pixels in the unit cell.

29. A printing system for digitally printing a gray scale image on a sheet, comprising:
   image input means for generating a plurality of gray scale values for a plurality of unit cells, each unit cell having at least two pixels;
   charge management means for establishing a charge value for each individual pixel of an unit cell corresponding to an associated generated gray scale value, the charge value for a first ON pixel in the unit cell being assigned a unit charge value, a charge value corresponding to succeeding ON pixels having a value which is less than the unit charge value assigned to the first ON pixel;
   a charge receptor;
   image formation means for creating a latent image on said charge receptor;
   development means for depositing toner upon the latent image to produce a developed image;
   transfer means for transferring the toner of the developed image to a sheet and for fusing the toner thereon; and
   image output means for outputting the sheet having an image thereon.

30. The system as claimed in claim 29, wherein said image forming means comprises:
   charging means for electrically charging ON pixel areas, within the unit cell, on the charge receptor such that an amount of charge deposited in an individual pixel area equals the charge value established by said charge management means for that pixel area.

31. The system as claimed in claim 30, wherein said charging means changes the amount of charge to be deposited in succeeding ON pixel areas by controlling a length of time that an electrical charge is applied to the pixel area, the length of time decreasing as the charge value decreases.

32. The system as claimed in claim 31, wherein said charging means changes the amount of charge to be deposited in succeeding ON pixel areas according to a gray scale which is greater than a gray scale defined by a number of pixels in the unit cell.

33. The system as claimed in claim 29, wherein said image forming means comprises:
   light means for applying light to ON pixel areas such that an amount of charge remaining in an individual pixel area equals the charge value established by said charge management means for that pixel area.

34. The system as claimed in claim 33, wherein said light means changes the amount of light to be applied in succeeding ON pixel areas by controlling a length of time that the light is applied to the pixel area, the length of time increasing as the charge value decreases.

35. The system as claimed in claim 34, wherein said light means changes the amount of light to be applied in succeeding ON pixel areas according to a gray scale which is greater than a gray scale defined by a number of pixels in the unit cell.

36. The system as claimed in claim 33, wherein said charge receptor is a photoreceptor.

* * * * *